Patented July 13, 1954

2,683,756

UNITED STATES PATENT OFFICE 2,683,756

METHOD OF CONDUCTING HYDROCARBON REACTIONS

Robert M. Kennedy, Newtown Square, and Abraham Schneider, Philadelphia, Pa., assignors to Sun Oil Company, Philadelphia, Pa., a corporation of New Jersey No Drawing. Application June 11, 1951, Serial No. 231,057

7 Claims. (Cl. 260—666)

This invention relates to reactions involving naphthenes, cyclo-olefins, cycloalkyl fluorides, and boron tri-fluoride, and is particularly directed to a method of reacting cyclo-olefins with naphthenes having a ring composed of five carbon atoms in the presence of a cycloalkyl fluoride and boron fluoride to form an alkyl substituted decalin and other valuable hydrocarbons.

In an application for Letters Patent of the United States filed July 10, 1948 (Serial No. 38,167), now Patent No. 2,557,113, there is described and claimed reactions of isoparaffins and olefins catalyzed by the combination of $BF_3$ and an alkyl fluoride. In application Serial No. 86,526, filed April 9, 1949, now Patent No. 2,557,115, there is described and claimed the alkylation of isobutane with isobutylene catalyzed by $BF_3$ and an alkyl fluoride to form 2,2,4-trimethylpentane.

It has now been discovered that by bringing together a cycloalkyl fluoride and $BF_3$ in the presence of a cyclo-olefin having a ring composed of 5 or 6 carbon atoms and a cyclopentane having at least 1 alkyl substituent and at least 1 tertiary hydrogen atom attached to a nuclear carbon atom, a catalytic condition is established which is effective to cause the alkyl cyclopentane and the cyclo-olefin to react to form an alkyl substituted decalin. In the reaction, a portion of the alkyl cyclopentane reacts with itself to form a dimer having a tetralin structure with at least 2 alkyl substituents. It is characteristic of the present process that a minor portion of the cyclo-olefin is converted to the corresponding naphthenic hydrocarbon, a portion of which may be isomerized to an isomer thereof.

To illustrate the process of the present invention, by contacting cyclohexyl fluoride and $BF_3$ in the presence of an admixture of methylcyclopentane and cyclopentene, methyldecalins are formed in substantial yield, and dimethyldecalins and cyclopentane are formed in minor quantities. A small amount of cyclohexane may be formed from the cyclohexyl fluoride.

In bringing together the cyclic fluoride and $BF_3$, the $BF_3$ can be introduced into an admixture of the naphthene and cyclo-olefin to which the cyclic fluoride has already been added, or the cyclic fluoride and $BF_3$ can be introduced simultaneously but separately into the admixture of naphthene and cyclo-olefin. It is permissible also first to dissolve the cyclic fluoride and $BF_3$ in separate portions of the reactants, and then bring together the separate portions to effect reaction. However, operation should be such as to avoid contact between the $BF_3$ and olefin in the absence of the other components, since the olefin may undergo polymerization. Also, it is not permissible to premix the cyclic fluoride and $BF_3$ and then add the mixture to an admixture of naphthene and cyclo-olefin, for in such case the catalytic condition will be immediately spent when the cyclic fluoride and $BF_3$ are brought into contact with each other. The present reaction is not observed on the separate addition of the cyclic fluoride or $BF_3$ to the admixture of reactants, or to either component thereof, except on contacting the cyclic olefin with $BF_3$ polymerization will be observed. It is only when the cyclic fluoride and $BF_3$ are brought together in the presence of both the naphthene and cyclo-olefin, as above-described, that the present reaction occurs. It appears that the catalytic effect is produced by extraction of the fluorine atom from the cyclic fluoride by the $BF_3$, resulting in the formation of carbonium ions which initiate the reactions. The cyclic fluoride serves principally to catalyze the reaction, and in general does not enter into the reaction to produce the products obtained, as hereinafter described. A small amount of the hydrocarbon corresponding to the fluoride appears in the product.

Cycloalkyl fluorides and $BF_3$ are both soluble in the reactants and form a homogeneous phase therewith irrespective of their mode of addition as above-described, so that reaction does not depend upon contact of separate phases, and hence the mechanical agitation required to provide contact between separate phases is unnecessary. This is a significant advantage over processes involving contact between separate phases, such as hydrocarbon reactions catalyzed by Friedel-Crafts catalysts including for example, aluminum chloride or hydrogen fluoride. It is characteristic of the process of the present invention that the reaction occurs instantaneously, i. e. the reaction is complete as soon as the components are mixed. This also is a substantial advantage over processes requiring contact between separate phases in that the size of reactors, because of the rapid throughput which is limited only by practical considerations, is reduced to a minimum.

The naphthenes which may be employed in the present process are the cyclopentanes having from 1 to 3 alkyl substituents and at least 1 tertiary hydrogen atom attached to a nuclear carbon atom. The total number of carbon atoms of the naphthene may vary from 6 to 30. Methylcyclopentane is a preferred naphthene to employ, as are ethylcyclopentane, propylcyclopentane, and isopropylcyclopentane, and good results are obtained with their homologues and isomers including for example, the various dimethyl, diethyl, methylethyl, methylpropyl and trimethyl cyclopentanes, and their higher homologues such as hexylcyclopentane, decyclopentane, and the like. Mixtures of naphthenes may also be employed, such as those obtainable from petroleum, the $C_6$–$C_{10}$ fraction, for example. Naphthenes having a ring composed of 6 carbon atoms do not undergo reaction in the present process.

By "tertiary hydrogen atom" is meant a hydrogen atom which is attached to a tertiary carbon atom, i. e., a hydrogen atom which is attached to a carbon atom which is also attached to three other carbon atoms.

The cyclo-olefins which may be employed in the present process are the cyclomono-olefins having a ring consisting of 5 or 6 carbon atoms with the olefinic linkage between nuclear carbon atoms. From 1 to 3 alkyl substituents may be attached to the ring, but the total number of carbon atoms of the cyclic olefin should not exceed 30, and preferably is not above 20. Cyclopentene is the preferred olefin to employ. Other cyclo-olefins which give good results are methylcyclopentene, ethylcyclopentene, n-propylcyclopentene, isopropylcyclopentene, the butyl cyclopentenes, cyclohexene, methylcyclohexene, ethylcyclohexene, and the higher homologues and isomers thereof.

The cycloalkyl fluorides which may be employed in the present process are those having either a 5 carbon atom ring or a 6 carbon atom ring, which are the cyclohexyl fluorides and the cyclopentyl fluorides, including cyclohexyl fluoride and cyclopentyl fluoride and alkyl substituted derivatives thereof, such as 2-methylcyclohexyl fluoride; 3-methylcyclohexyl fluoride; 4-methylcyclohexyl fluoride; 1-methylcyclohexyl fluoride; 1-methylcyclopentyl fluoride; 2-methylcyclopentyl fluoride; 1-ethylcyclopentyl fluoride; and homologues and isomers of the described fluorides, such as the ethyl, dimethyl and methylethyl homologues. Preferably, the cyclic fluoride should not have more than a total of 30 carbon atoms per molecule. The described fluorides have the fluorine atom attached to a carbon atom of the naphthene ring, and such fluorides are preferred. It is permissible, however, to have the fluorine atom attached to a carbon atom which in turn is attached to a carbon atom of the naphthene ring, such as fluoromethylcyclopentane, and such fluorides are included in the terms "cyclic fluoride" and "cycloalkyl fluoride." It is believed such fluorides form, under the conditions of the present process, carbonium ions identical to those of the preferred fluorides.

The present cyclic fluorides are conveniently prepared by adding hydrogen fluoride to the cyclic olefin corresponding to the desired cyclic fluoride. For example, adding hydrogen fluoride to cyclohexene gives cyclohexyl fluoride, and adding hydrogen fluoride to cyclopentene gives cyclopentyl fluoride, both of which fluorides are preferred components of the present process.

In carrying out the process of the present invention, the lowest operable temperature depends upon the cyclic fluoride employed. In the preferred case, where the cyclic fluoride is a secondary fluoride, i. e., where the fluoride atom is attached to a secondary carbon atom, such as in cyclohexyl fluoride, the lowest operable temperature is −90° C. With a tertiary fluoride, i. e., where the fluorine atom is attached to a tertiary carbon atom, such as in 1-methylcyclopentyl fluoride, temperatures as low as −120° C. are operable. With a primary fluoride, such as fluoromethylcyclopentane, a temperature of at least −10° C. is required. Regardless of what fluoride is employed the process may be operated at temperatures up to 150° C., but preferably, in all cases, the temperature is maintained from 0° C. to 100° C. When the naphthene employed is normally a solid, a temperature sufficient to maintain it as a liquid, up to the described limit, is advantageously employed.

The concentrations of the reaction mixture components may be varied and good results obtained. The mole ratio of cyclopentane to cyclo-olefin should be betwen 2:1 to 20:1 and is preferably from 4:1 to 10:1. The mole ratio of cyclic fluoride to cyclo-olefin should be between 0.1:1 to 1:1, and is preferably from 0.3:1 to 0.7:1. The quantity of BF₃ to employ is not critical only a small amount, a catalytic quantity, being sufficient to initiate the reaction which then proceeds to completion. However, it is preferred to employ a somewhat larger quantity of BF₃ than is required to initiate the reaction, since the resulting reaction is then more sharply defined in the production of the desired products, i. e., the quantity of high boiling products is held to a minimum. It is preferred to employ a quantity of BF₃ so that the mole ratio of BF₃ to cyclic fluoride is from 0.05:1 to 1:1, but even higher concentrations may be employed if desired.

The present reaction is conducted in the liquid phase. The pressure to employ is advantageously that of the BF₃ at the temperature of the reaction. Operating at a temperature within the preferred range with a concentration of the BF₃ also within the preferred range, the pressure will be from about 100 to 200 p. s. i. g., but may vary from about 10 to 500 p. s. i. g.

Although the mechanism of the present reaction is complicated, the overall reaction may be demonstrated by the following equation which is presented to illustrate the process and the principal products obtained, and which are not intended to show a carbon balance:

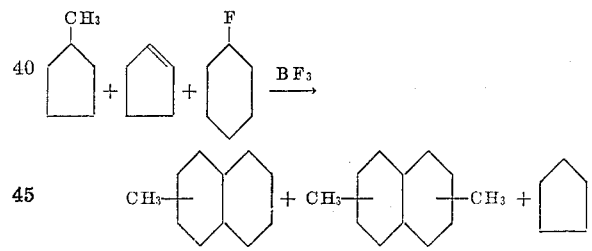

The methyldecalin product is obtained by the reaction of methylcyclopentane with cyclopentene, and the dimethyldecalin is the dimer of methylcyclopentane. The cyclopentane product is produced by the saturation of a portion of the cyclopentene. The methyldecalin and dimethyldecalin products consist of a mixture of position and geometrical isomers separation of which is unnecessary for practical purposes. Preferred reactants are used to illustrate the process in the above equation; other reactants as above-defined give corresponding products. For example, if ethylcyclopentane be substituted for methylcyclopentane, ethyl decalin from the reaction between ethylcyclopentane and cyclopentene, and diethyldecalins from the dimerization of ethylcyclopentane, will be the major products. If the cyclo-olefin has an alkyl substituent, the same substituent will appear on the decalin product obtained on reaction between the cyclo-olefin and methylcyclopentane.

A preferred embodiment of the present process is demonstrated by the equation, wherein the cyclic fluoride contains the same number of carbon atoms as the naphthene. It is believed that a portion of the fluoride, under the conditions of the present process, is converted into carbonium ions identical with the carbonium ions formed from the methylcyclopentane, and hence the yield of the desired product is enhanced, the complexity of the reaction mixture is reduced, and the quantity of sludge formed is reduced.

The following example illustrates a specific embodiment of the present process in which "parts" refers to parts by weight.

*Example*

To a solution of 6 parts of $BF_3$ in 140 parts of methylcyclopentane was added a solution consisting of 28.1 parts of methylcyclopentane, 21.5 parts of cyclohexyl fluoride and 59.5 parts of methylcyclopentane. The mole ratio of methylcyclopentane to cyclopentene was 5.75; the mole ratio of cyclohexyl fluoride to cyclopentene was 0.507; and the mole ratio of $BF_3$ to cyclohexyl fluoride was 0.422. The temperature of reaction was 20° C. and the pressure about 100 p. s. i. g.

On mixing the two solutions the reaction occurred immediately, the pressure rapidly decreasing to about 10 p. s. i. g. A lower layer, consisting of 33.5 parts, separated out and was removed by decanting.

The organic layer was washed, dried, and distilled. There were recovered 176.2 parts of methylcyclopentane containing a small quantity of cyclohexane and cyclopentane, 22.3 parts of methyldecalin, and 10.6 parts of a higher boiling residue containing about 2.6 parts of dimethyldecalin.

The above example illustrates a specific embodiment of the present invention. When other naphthenes or cyclo-olefins are employed, corresponding products are obtained as above-described. For example, if ethylcyclopentane be substituted for methylcyclopentane, the major product is a mixture of ethyldecalins.

The alkyl substituted decalins prepared in the present process are useful as chemical intermediates in, for example, the preparation of relatively pure substituted aromatic hydrocarbons of the naphthalene series by dehydrogenation.

In patent application Serial No. 231,052, filed June 11, 1951, there is described and claimed the reaction of isoparaffins having at least 1 tertiary hydrogen atom per molecule to form alkyl substituted naphthenes by bringing together a cycloalkyl fluoride and $BF_3$ in the presence of the naphthene.

In patent application Serial No. 231,054, filed June 11, 1951, there is described and claimed the reactions of cyclopentanes having at least 1 tertiary hydrogen atom attached to a nuclear carbon atom by bringing together $BF_3$ and an alkyl fluoride in the presence of the naphthene to form polyalkyl naphthenes.

In patent application Serial No. 231,055, filed June 11, 1951, there is described and claimed the reactions between cyclopentanes having at least 1 tertiary hydrogen atom attached to a nuclear carbon atom and olefins, including cyclo-olefins, by bringing together $BF_3$ and an alkyl fluoride in the presence of a mixture of the cyclopentane and olefin to form branched chain paraffins and alkyl substituted naphthenes.

In patent application Serial No. 231, 056, filed June 11, 1951, there is described and claimed the reactions of cyclopentanes having at least 1 tertiary hydrogen atom attached to a nuclear carbon atom or isoparaffins having at least 1 tertiary hydrogen atom with olefins by bringing together $BF_3$ and a cycloalkyl fluoride in the presence of a mixture thereof to form alkylated and polyalkylated naphthenes.

In patent application Serial No. 231,053, filed June 11, 1951, there is described and claimed the dimerization of cyclopentanes having at least 1 tertiary hydrogen atom attached to a nuclear carbon atom by bringing together $BF_3$ and cycloalkyl fluoride in the presence of the naphthene.

In patent application Serial No. 231,058, filed June 11, 1951, there is described and claimed the separation of napthenes having a ring composed of 5 carbon atoms and at least 1 tertiary hydrogen atom attached to a nuclear carbon atom from naphthenes having a ring composed of 6 carbon atoms by bringing together in the presence of a mixture thereof $BF_3$ and an alkyl fluoride or a cycloalkyl fluoride.

The invention claimed is:

1. Method of reacting a cyclopentane having from 1 to 3 alkyl substituents and at least 1 tertiary hydrogen atom attached to a nuclear carbon atom with a cyclo-olefin having not more than 3 alkyl substituents which comprises bringing together, in liquid homogeneous phase, $BF_3$ and a cycloalkyl fluoride selected from the group consisting of cyclopentyl fluorides and cyclohexyl fluorides in the presence of said cyclopentane and said cyclo-olefin to effect instantaneous reaction of said cyclopentane with said cyclo-olefin.

2. Method of reacting a cyclopentane having from 1 to 3 alkyl substituents and at least 1 tertiary hydrogen atom attached to a nuclear carbon atom with a cyclo-olefin having not more than 3 alkyl substituents which comprises bringing together, in liquid homogeneous phase, $BF_3$ and a cycloalkyl fluoride selected from the group consisting of cyclopentyl fluorides and cyclohexyl fluorides in the presence of said cyclopentane and said cyclo-olefin at a temperature sufficient to effect said reaction instantaneously, said temperature being in the range of from —120° C. to 150° C.

3. Method according to claim 2 wherein the cycloalkyl fluoride is cyclopentyl fluoride.

4. Method according to claim 2 wherein the cycloalkyl fluoride is cyclohexyl fluoride.

5. Method of preparing methyldecalin which comprises bringing together, in liquid homogeneous phase, $BF_3$ and cyclohexyl fluoride in the presence of methylcyclopentane and cyclopentene, and recovering methyldecalin from the reaction mixture.

6. Method of preparing methyldecalin by reacting methylcyclopentane with cyclopentene which comprises bringing together in liquid homogeneous phase at a temperature of from —90° C. to 150° C., $BF_3$ and cyclohexyl fluoride in the presence of methylcyclopentane and cyclopentene, wherein the mole ratio of methylcyclopentane to cyclopentene is from 2:1 to 20:1, the mole ratio of cyclohexyl fluoride to cyclopentene is from 0.1:1 to 1:1, and the mole ratio of $BF_3$ to cyclohexyl fluoride is from 0.05:1 to 1:1, and recovering methyldecalin from the reaction mixture.

7. Method of preparing ethyldecalin which comprises bringing together, in liquid homogeneous phase, $BF_3$ and cyclohexyl fluoride in the presence of ethylcyclopentane and cyclopentene, and recovering ethyldecalin from the reaction mixture.

References Cited in the file of this patent

UNITED STATES PATENTS

| Number | Name | Date |
|---|---|---|
| 2,304,290 | Van Peski | Dec. 8, 1942 |
| 2,315,078 | Pines et al. | Mar. 30, 1943 |
| 2,340,557 | Pines et al. | Feb. 1, 1944 |